(12) United States Patent
Ozanne

(10) Patent No.: US 10,687,659 B2
(45) Date of Patent: Jun. 23, 2020

(54) BEVERAGE PREPARATION DEVICE WITH PUMP AND METHOD FOR CONTROLLING THE PUMP

(71) Applicant: NESTEC S.A., Vevey (FR)

(72) Inventor: Matthieu Ozanne, Publier (FR)

(73) Assignee: Societe des Produits Nestle S.A., Vevey (CH)

( * ) Notice: Subject to any disclaimer, the term of this patent is extended or adjusted under 35 U.S.C. 154(b) by 379 days.

(21) Appl. No.: 15/531,777

(22) PCT Filed: Nov. 30, 2015

(86) PCT No.: PCT/EP2015/078050
§ 371 (c)(1),
(2) Date: May 31, 2017

(87) PCT Pub. No.: WO2016/087362
PCT Pub. Date: Jun. 9, 2016

(65) Prior Publication Data
US 2017/0265677 A1   Sep. 21, 2017

(30) Foreign Application Priority Data

Dec. 1, 2014 (EP) ..................................... 14195563

(51) Int. Cl.
*A47J 31/00* (2006.01)
*A47J 31/46* (2006.01)
(Continued)

(52) U.S. Cl.
CPC ........... *A47J 31/468* (2018.08); *A47J 31/002* (2013.01); *A47J 31/24* (2013.01); *A47J 31/34* (2013.01); *A47J 31/4457* (2013.01); *A47J 31/52* (2013.01)

(58) Field of Classification Search
CPC ........... A47J 31/002; A47J 31/24; A47J 31/34
(Continued)

(56) References Cited

U.S. PATENT DOCUMENTS

| 2015/0230655 A1* | 8/2015 | Hoog | A47J 31/545 426/231 |
| 2015/0320254 A1* | 11/2015 | Perentes | A47J 31/22 426/232 |
| 2015/0374168 A1* | 12/2015 | Sampoli | A47J 31/56 426/433 |

FOREIGN PATENT DOCUMENTS

| CN | 1354997 A | 6/2002 |
| CN | 101528588 A | 9/2009 |

(Continued)

*Primary Examiner* — Reginald Alexander
(74) *Attorney, Agent, or Firm* — K&L Gates LLP

(57) ABSTRACT

The present invention relates to a beverage preparation device designed for preparing a beverage upon injection of liquid into an ingredients-containing cartridge, the device comprising a pump (106) coupled between a fluid inlet (102) and a fluid outlet (104) for pumping the fluid from said inlet to said outlet, and a processing unit (108) for the pump (106) adapted to control an operation of the pump in response to an electrical energy (121) having a wave form such that the pump is energized only throughout selected half cycles ($a_1, a_2, a_3 \ldots a_n$) of the wave form of the electrical energy, wherein the processing unit (108) is configured to determine the respective selected half cycles ($a_1, a_2, a_3 \ldots a_n$) in which the pump is energized based on a target ratio (TR) of a target flow rate (FR) and a predefined maximum flow rate of the pump, and based on the calculation of an activation ratio (AR) of the number of past half cycles (A) for which the pump was energized to the number of overall half cycles (B) during a respective beverage preparation process. The present invention further relates to a method for controlling a pump in a beverage preparation device.

15 Claims, 6 Drawing Sheets

(51) Int. Cl.
*A47J 31/24* (2006.01)
*A47J 31/34* (2006.01)
*A47J 31/52* (2006.01)
*A47J 31/44* (2006.01)

(58) Field of Classification Search
USPC .................. 99/283, 280, 300, 302 R, 307
See application file for complete search history.

(56) References Cited

FOREIGN PATENT DOCUMENTS

| | | | |
|---|---|---|---|
| CN | 101554986 A | 10/2009 | |
| EP | 1969979 | 9/2008 | |
| WO | 2006074170 | 7/2006 | |
| WO | 2012129543 | 9/2012 | |
| WO | WO-2014032110 A1 * | 3/2014 | .......... A47J 31/0652 |

* cited by examiner

FIG. 6

BEVERAGE PREPARATION DEVICE WITH PUMP AND METHOD FOR CONTROLLING THE PUMP

CROSS REFERENCE TO RELATED APPLICATIONS

The present application is a National Stage of International Application No. PCT/EP2015/078050, filed on Nov. 30, 2015, which claims priority to European Patent Application No. 14195563.3, filed on Dec. 1, 2014, the entire contents of which are being incorporated herein by reference.

FIELD OF THE INVENTION

The present invention relates to a beverage preparation device comprising an electrically operated pump coupled between a fluid inlet and a fluid outlet for pumping the fluid from said inlet to said outlet, and further comprising a processing unit for enabling an advanced control of the pump.

The present invention further relates to a method for controlling a pump in a beverage preparation device.

BACKGROUND OF THE INVENTION

Beverage preparation devices designed for dispensing beverages are well-known and commonplace in both domestic and commercial environments. These devices are generally configured for preparing cold or hot beverages on-demand such as in particular a coffee or tea beverages in case the device comprises a heating unit, or chilled drinks such as in particular soft drinks or water. In the later case, the device may be equipped with a refrigeration unit.

A common principle in this field is the beverage preparation by means of an ingredients containing cartridge or capsule, which is inserted into dedicated receiving means of the device and from which a beverage is prepared by provision of liquid into the cartridge. Thereby, a predefined amount of liquid at a desired flow rate and pressure is provided to the capsule in order to interact with the ingredients contained therein, such as e.g. by extraction or by brewing. The resulting beverage is then preferably directly poured from the cartridge into a provided receiving vessel.

The known beverage preparation devices usually implement a fluid circuit such as schematically indicated in FIG. 7. Thereby, a water supply tank 10 of the device 100a is connected to a pump 106 and a flow meter 30 detecting the flow rate and volume of liquid through a tubing interconnecting the pump 106 and the water supply 10. A water filter 20 may be placed in the fluid path between supply 10 and pump 106. The device may comprise a heating unit such as a thermoblock 112 arranged in the fluid path from pump 106 to a receiving chamber 118 for receiving and holding a cartridge 40 containing beverage ingredients. A liquid beverage poured from the cartridge 40 is received in a receiving cup 70. The pump as used in these devices is generally a solenoid pump such as for example described in European application EP 2 107 242 A1.

In the known devices such as EP 2 107 242 A1, control of the water flow rate and thus amount of liquid provided into the receiving chamber containing the cartridge is usually obtained by activation of the pump based on a phase angle control of the provided current and provision of a feedback loop between the flow meter and the pump which enables the adjustment of the phase angle control based on the effective measurement of the flow rate and/or amount of liquid already provided to the receiving chamber.

Due to increasing requirements regarding miniaturizing of the beverage preparation device size and reduction of manufacturing costs, it is desired to reduce the number of components in the device. In view of these demands a solution is sought-after which enables an enhanced control of the flow rate and thus liquid volume provided by the pump of the device in a given time but without the provision of a dedicated flow meter in the fluid circuit of the device. Thereby, it is further desired to provide a reliable control of the fluid flow rate provided to the cartridge of the device in order to maintain a reproducible and optimum result regarding strength and volume of the resulting beverage.

Further, as the activation and deactivation of the pump in irregular manner may lead to unpleasant sound due to the pumping member interacting with a stop member or frame of the solenoid pump, an essential homogenous activation of the pump is desired.

The present invention provides a solution to the beforementioned problems and offers additional benefits to the existing art as will be apparent in the following description.

SUMMARY OF THE INVENTION

In a first aspect, the invention proposes a beverage preparation device designed for preparing a beverage upon injection of fluid into an ingredients-containing cartridge, the device comprising:
   aa electrically operated pump coupled between a fluid inlet and a fluid outlet for pumping the fluid from said inlet to said outlet, and
   a processing unit for the pump adapted to control an operation of the pump in response to an electrical energy, the electrical energy having a wave form such that the pump is energized only throughout selected, preferably positive, half cycles of the wave form,
wherein the processing unit is configured to determine the respective selected half cycles in which the pump is energized
   based on a target ratio of a target flow rate and a predefined maximum flow rate of the pump, and
   based on the calculation of an activation ratio of the number of past half cycles for which the pump was energized to the number of overall half cycles during a respective beverage preparation process.

The invention is based on the realization that without a dedicated flow meter in the fluid circuit of the device, the processing unit may set a power of the pump dependent on a desired flow rate in relation to the maximum flow rate obtainable when fully energizing the pump throughout each positive half cycle of the wave form of the electrical energy. A reduction of power to the pump and thus of flow rate may be obtained by switching the pump off part of the time in order to energize the pump only during certain selected half cycles of wave form of the electrical energy delivered to the pump.

The inventive device thus enables a control of the pump for obtaining any desired flow rate being a fraction of a predefined maximum flow rate of the pump, irrespective of the fraction being a multiple of the half cycles of the wave form of the electrical energy or not.

For example, if a flow rate of 150 ml/min is desired, and a predefined maximum flow rate 400 m/l of the pump is defined, the invention enables the selection of half cycles of the wave form of the electrical energy for which the pump is energized, although wave form of the electrical energy does not present half cycles that are a multiple of the ratio 150/400.

The processing unit further selects the respective half cycles throughout which the pump is energized such that an essentially homogenous activation of the pump is obtained. In the particular example above, 150 ml/min may be obtained by switching the pump on three times for 5 consecutive half cycles out of 40 half cycles (150/400=(5+5+5)/40). This would however result in an unpleasant sound of the pump. Indeed each time the piston of the pump hits the frame of the pump, a small sound may be perceived. Depending on the regularity of these small sounds, the global sound of the pump is perceived as unpleasant. This would be the case with the pump switched on for 5 half periods and then suddenly switched off during 10 half periods.

The present invention however provides for an essentially homogenous activation of the pump independent of the desired flow rate, due to the selection of the half cycles in which the pump is energized based on the activation ratio of the number of past half cycles for which the pump was energized to the number of overall half cycles during a respective beverage preparation process.

The processing unit is thus preferably configured to determine the respective half cycles in which the pump is energized such as to provide for an essentially continuous activation of the pump throughout the beverage preparation process, i.e. to prevent strong deviations and/or bursts in the fluid flow. In accordance with this principle, the device respectively the processing unit thereof is preferably void of a burst fire control and a phase angle control of the pump.

The processing unit of the device is preferably configured to constantly compare the values of the target ratio and the activation ratio. Thereby, the comparison is preferably carried out for each respective positive half cycle of the wave form of the electrical energy.

In a preferred embodiment, the processing unit is configured to individually calculate for each of the respective half cycles of the wave form of the electrical energy whether the pump is to be energized throughout the respective half cycle or not.

The pump is preferably energized by the processing unit for the respective half cycle in case the activation ratio is lower than the target ratio.

The pump of the device is a pump energized with the positive half cycles of the wave form of the electrical energy by means of the processing unit. The electrical energy is usually an alternating current, preferably a sinusoidal current. The electrical energy supply may be a rectified sinusoidal current. The current to the pump is thereby preferably cut, when the wave form of the electrical energy crosses "0".

The pump is preferably a solenoid pump. The solenoid pump may comprise a spring-loaded pumping member preferably axially displaceable between a spring-loaded position and a spring-released end position.

The pump preferably presents an ideal and maximum flow rate when energized with full power, i.e. when the pump is energized in each of the respective half cycles of the wave form of the electrical energy. The maximum flow rate may be between e.g. 200 and 600 ml/min.

The device preferably comprises a device for identifying the ingredients-containing cartridge inserted in the beverage preparation device which enables the processing unit to define the target flow rate and/or the amount of liquid provided into the cartridge during the beverage preparation process.

The device can also comprise a user interface which enables a user to define the target flow rate and/or the amount of liquid provided into the cartridge during the beverage preparation process. Thereby, the user interface may as well be adapted for selection of a desired beverage strength, which is then calculated by the processing unit of the device into a desired target flow rate for the respective beverage preparation process.

In a preferred embodiment, the device is void of a flow meter for detecting an actual flow rate in a fluid circuit of the device.

In a further aspect, the invention relates to a method for controlling an electrically operated pump for pumping a fluid from a fluid inlet to a fluid outlet of a beverage preparation device, the method comprising the steps of:
  generating a control signal for operating the pump from an electrical energy having a wave form,
  providing the control signal to energize the pump only throughout selected preferably positive half cycles of the wave form of the electrical energy,
wherein the respective selected half cycles in which the pump is energized are determined:
  based on a target ratio of the target flow rate and a defined maximum flow rate of the pump, and
  based on the calculation of an activation ratio of the number of past half cycles for which the pump was energized to the number of overall half cycles during a respective beverage preparation process.

A pump operated in accordance with the method of the present invention enables the provision of a desired flow rate being a fraction of the maximum flow rate without a required feedback loop of a flow meter of the device, and further does not produce an unpleasant sound during operation as previously explained.

In addition, an essentially constant activation of the pump and thus a constant flow rate may be obtained, as previously explained. According to this principle of the invention, the respective half cycles in which the pump is energized are preferably determined such as to provide for an essentially continuous activation of the pump throughout the beverage preparation process, i.e. to prevent strong deviations and/or bursts in the fluid flow.

In a preferred embodiment, the method comprises the steps of constantly comparing, i.e. preferably for each respective half cycle of the wave form, the values of the target ratio and the activation ratio and determining whether the pump is to be energized throughout the respective half cycle or not. Thereby, the activation ratio is preferably recalculated for each of the respective half cycles of the wave form of the electrical energy.

The method preferably comprises the step of providing the control signal to energize the pump throughout a respective half cycle of the wave form of the electrical energy in case the activation ratio is lower than the target ratio.

In a preferred embodiment, the method comprises the steps of:
  setting a target ratio (TR) for the beverage preparation based on the ratio of a desired target flow rate (FR) and a predefined maximum flow rate of the pump,
  setting an initial integer value of counting variables A and B to "1",
  comparing for each respective half cycle of the wave form of the electrical energy the ratio of A/B to the target ratio (TR), and:
    if the ratio A/B is inferior or equal to the target ratio (A/B), energizing the pump throughout the respective half cycle, if the ratio A/B is superior to the target ratio (A/B), not energizing the pump (106) throughout the respective half cycle and increasing the integer variable A by "+1", increasing the integer variable B by "+1" after the determination of the ratio A/B for each respective half cycle.

Preferably when at one step ($B_{max}$) it is determined that, for the corresponding half cycle (n) of the wave form of the electrical energy, the difference between the ratio of $A/B_{max}$ and the target ratio (TR) is inferior to a predetermined percentage, for example 1%, then each of the integer variables A and B are reset for 1.

As a consequence the pattern of energizing on and off the pump (1 to n) is repeated from the beginning.

The method steps of the invention may be implemented in a processing unit of a beverage preparation device or implemented in software on a signal processor of the device.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 6 depicts preferred examples for different values of target flow rates and the corresponding control of the solenoid pump in accordance with the inventive solution.

DETAILED DESCRIPTION OF THE FIGURES

Figure 1:
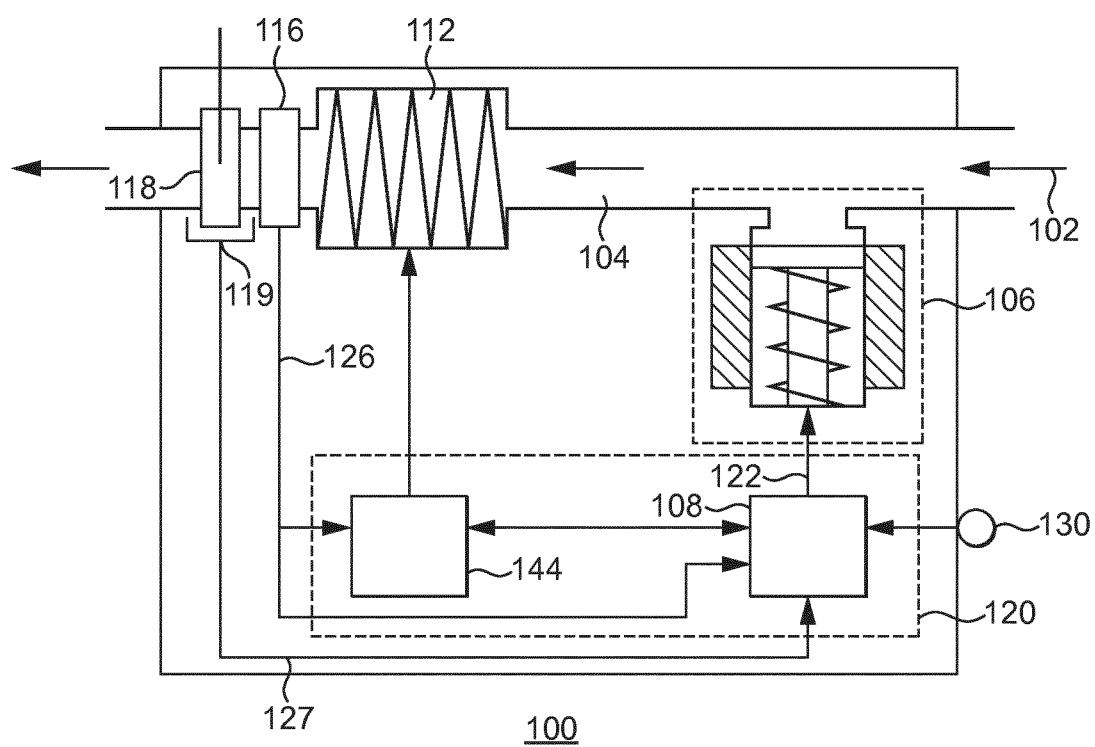
FIG. 1 schematically depicts a beverage preparation device in accordance with an embodiment of the present invention.

It is to be understood that the figures are merely schematic and are not drawn to scale. Further, the same reference numerals are used throughout the figures to indicate the same or similar parts.

FIG. 1 schematically depicts a beverage preparation device 100 in accordance with a preferred embodiment of the present invention. The beverage preparation device 100 comprises a fluid inlet 102, e.g. an inlet for receiving a liquid such as water, and a fluid outlet 104 for dispensing a beverage, preferably into a receptacle of a user of the beverage preparation device 100. A solenoid pump 106 is arranged between the fluid inlet 102 and the fluid outlet 104 for pumping a fluid from the inlet to the outlet. The device is preferably void of a flow meter in the fluid circuit thereof. The solenoid pump 106 is controlled by a processing unit 108, which will be described in more detail later.

In addition, the beverage preparation device 100 may have any suitable configuration, since the embodiment of the beverage preparation device 100 is not critical to the present invention. For example, the beverage preparation device may comprise a temperature adjustment stage 112, which may be a fluid heating stage, e.g. a thermoblock and/or a fluid refrigeration stage, and a temperature sensor 116.

In a preferred embodiment, the device 100 comprises a receiving chamber 118 for receiving a beverage brewing product, preferably an ingredients-containing cartridge or capsule. The cartridge preferably contains coffee or tea ingredients for reconstituting a liquid beverage upon interaction with water passing through the cartridge. Other embodiments are however equally suitable, wherein the cartridge contains other nutritional ingredients.

The processing unit 108 is arranged to provide the solenoid pump 106 with a control signal 122 to energize the pump 106 for a predefined amount of time. The control signal 122 is defined by the processing unit 108 to ensure that the fluid presented at the fluid outlet 104 has the required properties, in particular a desired fluid rate. Thereby, the processing unit is designed for energizing the pump based on an electrical energy having a wave form, preferably a rectified alternating current supply.

The processing unit 108 can be connected to a user interface 130, e.g. one or more buttons, for allowing a user to define a desired fluid output requirement, in particular the fluid flow rate and/or the amount of fluid provided to a cartridge (no shown) situated into receiving chamber 118 during a respective beverage preparation process. Thereby, the user may as well indicate a desired strength of the resulting beverage which is then calculated to a particular flow rate and/or amount of fluid to be provided to the cartridge placed into receiving chamber 118. For this reason, the processing unit 108 may comprise look-up tables or stored data for calculating a desired flow rate based on the selected beverage strength of the user.

Alternatively or simultaneously the beverage preparation device 100 may comprise a device for identifying the ingredients-containing cartridge or capsule 119 and designed to provide the processing unit 108 with a signal 127 related to the identification of the capsule and providing in particular information about the fluid flow rate and/or the amount of fluid provided to a cartridge (no shown) situated into receiving chamber 118.

The processing unit 108 is further adapted to store a predefined maximum flow rate of the solenoid pump 106 obtainable when constantly energizing the pump by means of the control signal 122.

The processing unit 108 may further be adapted to control the temperature adjustment stage 112. Further, a feedback signal of a temperature sensor 116 may be fed to the processing unit 108. Thereby, the processing unit 108 may be configured to start and/or stop a pumping action of the solenoid pump 106 upon information provided by the temperature sensor 116. The device may further comprise an additional processing unit 114 for controlling the temperature adjustment stage 112 in response to a feedback signal of the temperature sensor 116 and/or information provided by the processing unit 108.

It should be appreciated that the above examples of possible control mechanisms of the solenoid pump 106 are non-limiting examples only. Other suitable control principles involving the processing unit 108 will be apparent to the skilled person, and it should be understood that combinations of the suitable control mechanisms including the disclosed control mechanisms are also feasible. The processing unit 108 may be a discrete component of the beverage preparation device 100 realized in hardware. Alternatively, the processing unit 108 may be a part of a signal processor 120, which may be further arranged to implement other processing units, e.g. the processing unit 114 for controlling the temperature adjustment stage 112, and for processing feedback signals such as the feedback signal 124 from the temperature sensor 116. The processing unit 108 may be implemented in software on such a signal processor 120.

Figure 2:
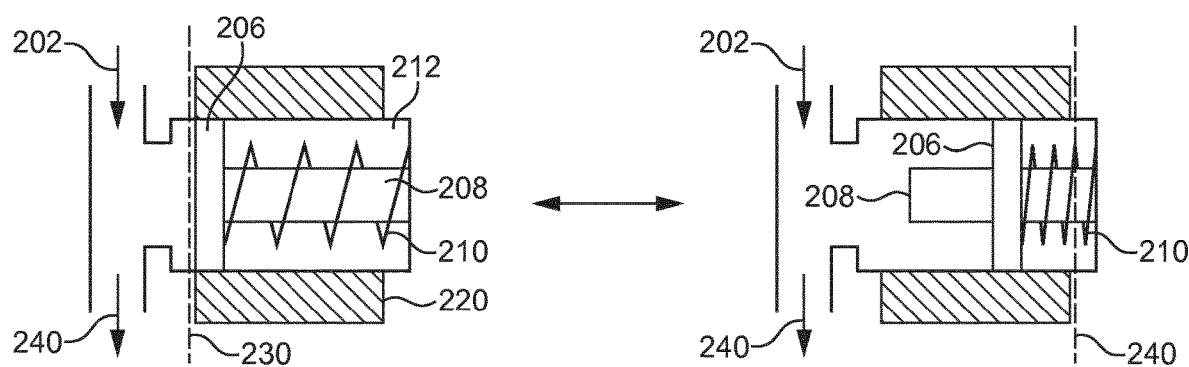
FIG. 2 schematically depicts a solenoid pump of the beverage preparation device in accordance with an embodiment of the present invention.
Figure 3:
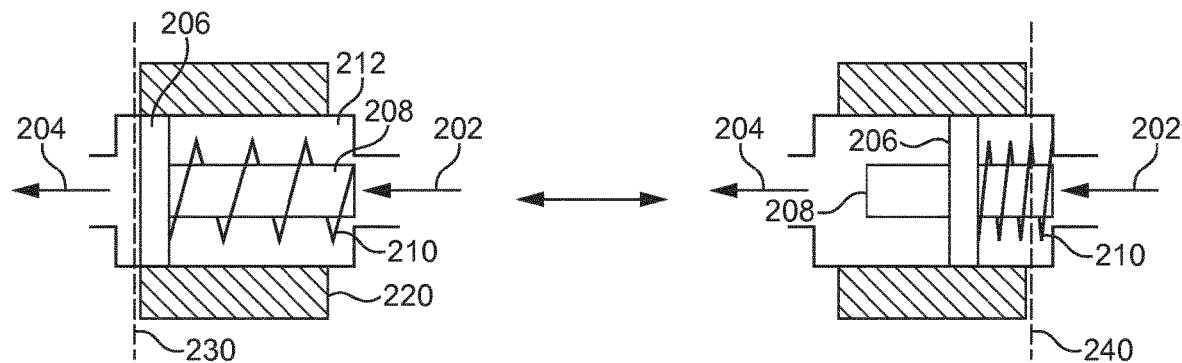
FIG. 3 schematically depicts an alternative embodiment of a solenoid pump of the beverage preparation device.

FIGS. 2 and 3 show preferred embodiments of the solenoid pump 106 of the device 100 according to the present invention. The pump 106 comprises an axially displaceable pumping member 206, e.g. a piston or a diaphragm, which is axially displaceable over an axis 208 under control of a solenoid 220. A spring 210 is mounted behind the pumping member 206 such that the spring 210 is compressed when the pumping member 206 is moved towards the inlet 202 under control of the solenoid 220. Accordingly, the pumping member 206 can be axially moved between an end position 230, in which the spring 210 has released its tension, and a spring-loaded position 240 under control of the solenoid 220, in which the spring 210 is fully compressed. The displacement of the pumping member 206 from end position 230 towards the spring loaded position 240 causes a fluid to be sucked into the chamber 212 of the solenoid pump 106 through inlet 202, whereas the release of the tension in the spring 210 causes the pumping member 206 to be displaced towards the end position 230, thereby pumping the fluid collected in the chamber 212 through the outlet 204.

The solenoid pump 106 as shown in FIG. 2 is configured to have a T-junction arrangement between the inlet 202, the outlet 204 and the chamber 212 of the solenoid pump 106. In the solenoid pump 106 shown in FIG. 3, the chamber 212 is placed between the inlet 202 and the outlet 204.

As has been explained previously, the release of the tension in the spring 210 during the pumping action of the solenoid pump 106 accelerates the pumping member 206 towards the end position 230, with the impact of the pumping member 210 at the end position 230 creating a substantial amount of sound. This amount of sound is very unpleasant in particular when the pump is activated in an irregular pattern. Accordingly, the present invention aims at providing for an essentially homogenous activation of the pump, irrespective of a desired target flow rate.

Figure 4:
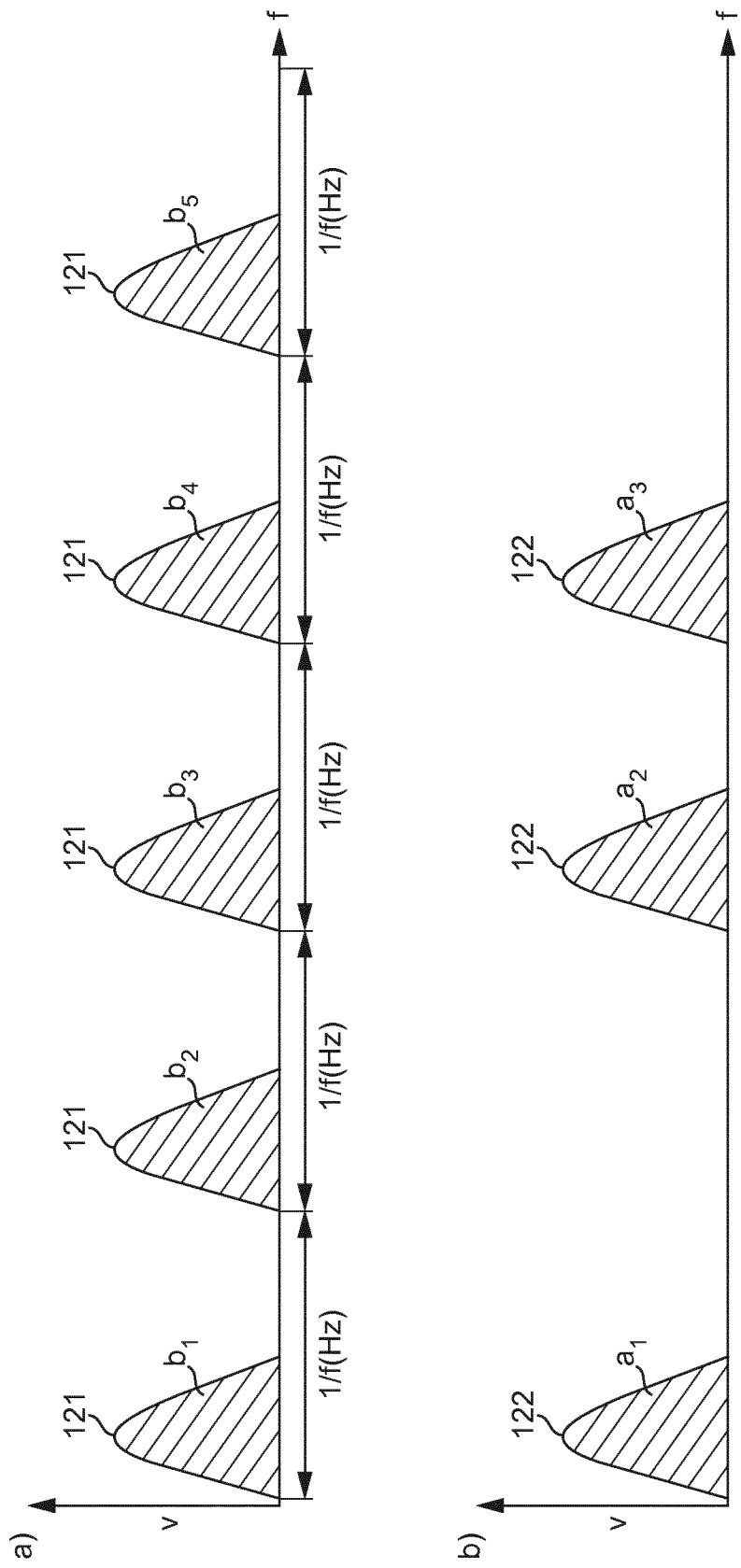
FIG. 4 schematically depicts the generation of a control signal for a solenoid pump in accordance with an embodiment of the present invention.

FIG. 4 shows a control signal 122 produced by the processing unit 108 in accordance with an embodiment of the present invention. Thereby, graph a) relates to a rectified sinusoidal current supply signal 121 provided to the processing unit 108. The supply signal 121 thus corresponds to the respective positive half periods of a current alternating at a frequency f, e.g. 50 Hz or 60 Hz. Graph b) indicates an example for a control signal 122 provided to energize the pump 106 which is based on the alternating current supply signal 121. Thereby, the amplitude of the control signal 122 is the drive voltage V of the solenoid pump 106.

The processing unit 108 is designed to forward the supply signal 121 as control signal 122 for energizing the pump 106 only throughout specifically determined half cycles $a_1, a_2, a_3 \ldots a_n$ of the alternating current half cycles $b_1, b_2, b_3, b_4, b_5 \ldots b_n$ of the supply signal 121.

The respective half cycles $a_1, a_2, a_3 \ldots a_n$ for which the pump is to be energized by the control signal 122 are determined by the processing unit 108 based on a defined target ratio of a desired target flow rate and a predefined maximum flow rate of the pump 106, and based on the preferably continuous calculation of an activation ratio A/B of the number of past half cycles A, i.e. the sum of half cycles $a_1, a_2, a_3 \ldots a_n$ for which the pump was already energized in the respective beverage preparation process, to the number of overall half cycles B (the sum of $b_1, b_2, b_3, b_4, b_5 \ldots b_n$) in the respective beverage preparation process.

The processing unit 108 is configured to constantly calculate, i.e. preferably for each of the half cycles $b_1, b_2, b_3, b_4, b_5 \ldots b_n$ of the supply signal 121, whether the pump 106 is to be energized throughout the respective half cycle by means of a dedicated control signal $a_1, a_2, a_3 \ldots a_n$ or not. Thereby, the processing unit 108 preferably compares for each half cycle $b_1, b_2, b_3, b_4, b_5 \ldots b_n$ of the supply signal 121, whether an actually calculated activation ratio A/B is smaller than the desired target ratio, and energizes the pump 106 throughout the respective half cycle $a_1, a_2, a_3 \ldots a_n$ by means of a dedicated signal 122 if this is the case.

It will be appreciated that the shape of the supply and control signal 121,122 in FIG. 4 are shown by way of non-limiting example only. Other shapes are equally feasible. For instance, the control signal 122 does not have to be derived from a sinusoidal current supply 121. Other wave forms, e.g. square waves, are equally feasible.

Figure 5:
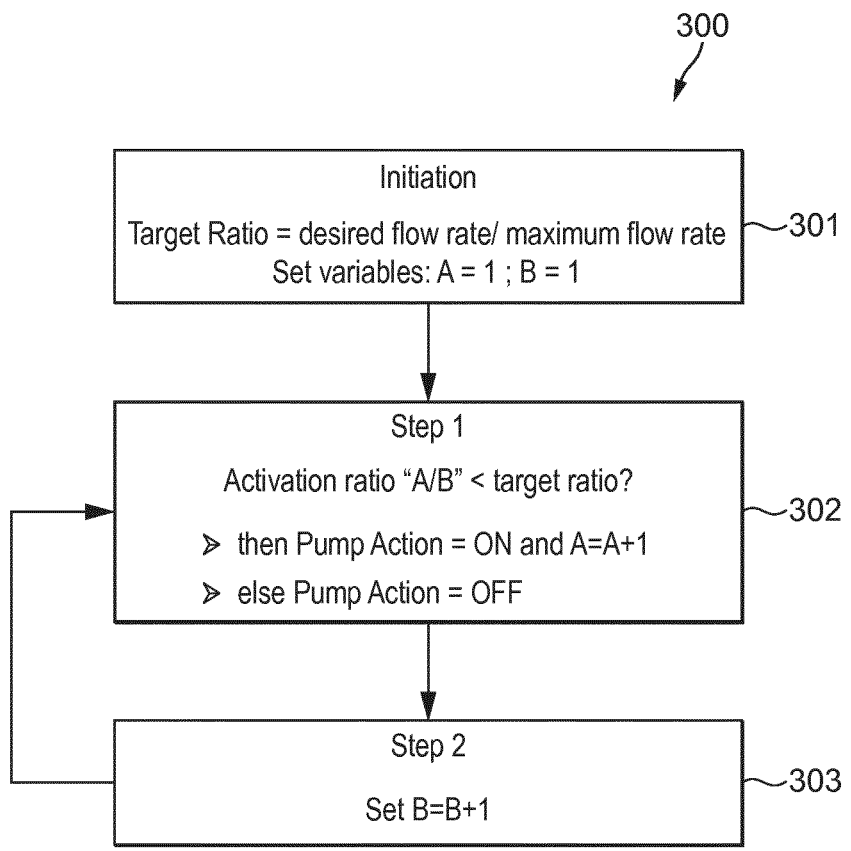
FIG. 5 depicts a preferred example of a process according to the invention.
Figure 7:
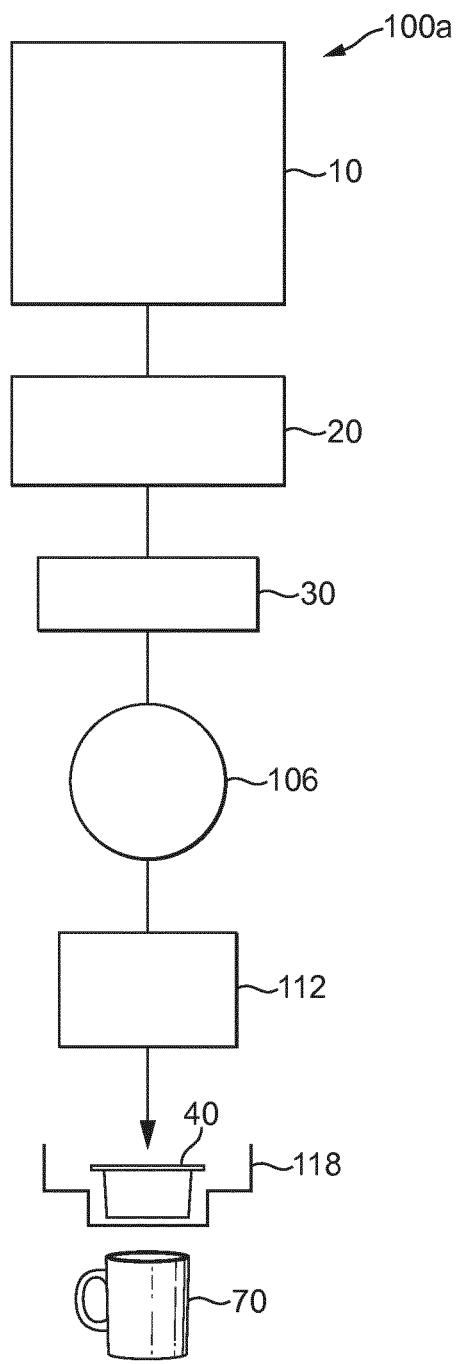
FIG. 7 schematically depicts a fluid circuit of a prior art beverage preparation device.

FIG. 5 depicts a preferred example of a process 300 for controlling a pump of a beverage preparation device according to the invention. Thereby, during a beverage preparation process, in a first initialization step 301, the target ratio is defined as being a ratio of a desired flow rate, e.g. based on a user input or a capsule identification, and a maximum flow rate obtainable when energizing the pump 106 throughout each respective half cycle of an alternating current supply.

The maximum flow rate may be preset in a processing unit 108 of the device. Further, the counting variables A and B are set to "A=1" and "B=1". Thereby, variable A is the number of activated half cycles, i.e. the half cycles in which the pump 106 was energized during the respective beverage preparation process, and variable B is the total number of half cycles of an alternating current supply signal 121 for the respective beverage preparation process.

In the next step 302, an activation ratio of variables A/B is compared to the predefined target ratio. This is preferably calculated for each of the respective half cycles of the alternating current supply signal 121. In case ratio A/B is smaller or equal than the target ratio, the pump is activated throughout the respective half cycle of the alternating current. This is obtained by sending a dedicated control signal 122 to the pump during the respective half cycle. In case the ratio A/B is higher than the target ratio, the pump is not activated by a dedicated control signal 122.

In the next step 303, the counting variable B is set to "B=B+1".

Steps 302 and 303 are repeated for each of the respective half cycles $b_1, b_2, b_3, b_4, b_5 \ldots b_n$ of an alternating current supply signal 121 until the respective beverage preparation process if finished. This can be triggered by a user input, such as pressing of a stop button, or if a predefined time has lapsed.

Preferably, if at one step $B_{max}$, it is determined that the ratio of $A/B_{max}$ equals the target ratio (TR) or the difference between these ratios is inferior to a predetermined percentage, then each of the integer variables A and B are reset for 1.

Figure 6:
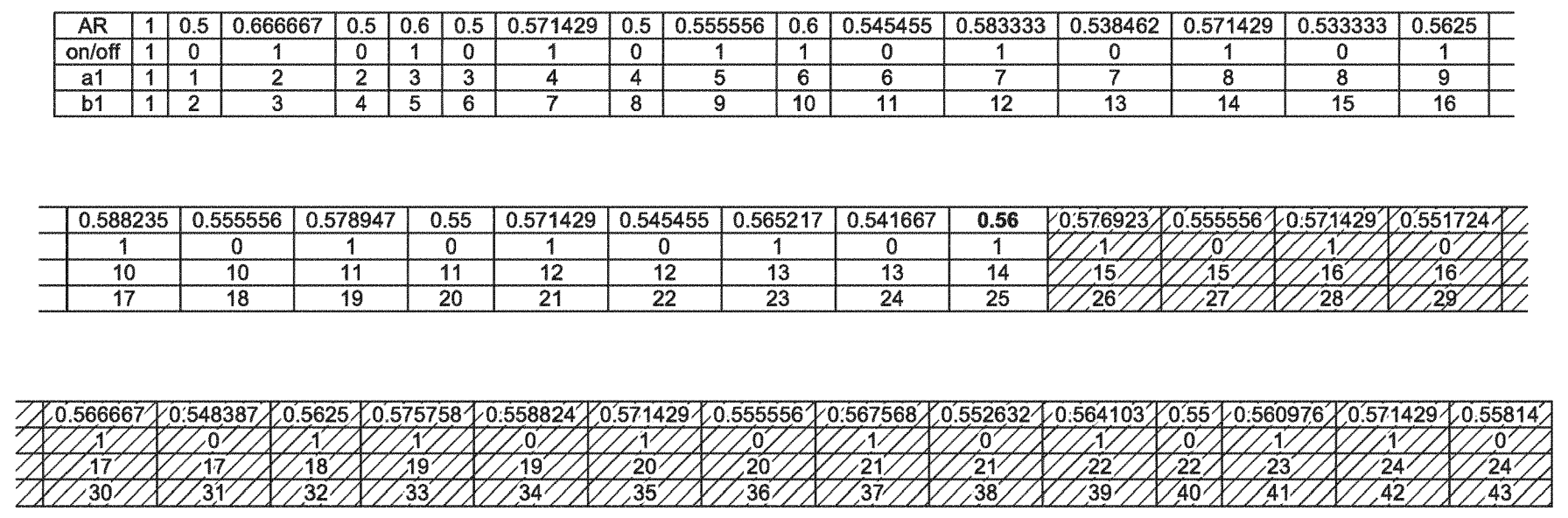

FIG. 6 depicts one example for a desired flow rate and the corresponding control of the solenoid pump in accordance with the inventive solution. The respective desired flow rate FR is 225 ml/min. The predefined maximum flow rate of the pump is 400 ml/min.

For a desired flow rate of 225 ml/min, a target ratio TR=0.56 is calculated from 225 ml/min divided by 400 ml/min being the predefined maximum flow rate of the pump of the device in case the pump is energized throughout each of the respective positive half cycles of the alternating current supply.

At the start of the beverage production process, variables A and B are set to "1" as previously described. During the beverage production process and preferably for each of the positive half cycles of the alternating current supply, it is calculated whether an actual activation ratio AR="A/B" (indicated in the respective $1^{st}$ row of the table) is smaller than the predefined target ratio TR, and if this is the case the pump is energized, otherwise not. This is indicated by "1" (pump energized) and "0" (pump not energized) in the respective cell of the $2^{nd}$ row of the table (on/off).

It is noted that each column of the table relates to a positive half cycle of the alternating current supply, for which the calculation of the respective values is carried out and for which it is determined whether the pump is energized in the respective half cycle or not. Accordingly, it is constantly calculated whether the pump is to be energized or not in order to obtain a desired flow rate, based on the comparison of the target ratio TR and a constantly updated activation ratio AR.

As can be derived from the $2^{nd}$ row in the table which shows the ON and OFF states of the pump in the respective half cycles, an essentially homogenous activation of the pump is obtained throughout the beverage preparation process. This is in strong contrast to e.g. a known burst fire control mode of solenoid pumps, in which the pump is activated for a subsequent period of time and then switched of for another subsequent period.

As can be seen with the grey zone in the table, at the $25^{th}$ half cycle, the flow rate equals 0,56 and the difference between the actual activation ratio AR and the target ratio TR is null. Consequently the determination of the respective half cycles in which the pump is activated can be started from the beginning again after these 25 cycles: A and B can be reset for 1.

In this particular example, for obtaining a fluid rate of 225 ml/min out of a maximum flow rate of 400 ml/min, the inventive control method has calculated the activation of the half cycles in which the pump is energized to be 25. Thereby, the 25 half cycles in which the pump is energized are distributed essentially homogenously over the 25 half cycles by means of the inventive method.

It is noted that every desired flow rate being a fraction of a predefined maximum flow rate may be obtained by the inventive solution without the requirement of a cost-intensive feedback loop of a given flow meter of the device. Moreover the sound of the pump of the device is not unpleasant.

The desired flow rate of the pump may be set due to a user input of the beverage preparation device. The desired flow rate may however be as well chosen by the processing unit in response to e.g. a reading of a dedicated indicator on a cartridge inserted into the device and thus dependent on the amount and/or type of ingredients contained in the respective cartridge.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A beverage preparation device designed for preparing a beverage upon injection of fluid into an ingredients-containing cartridge, the beverage preparation device comprising:
    an electrically operated pump coupled between a fluid inlet and a fluid outlet for pumping the fluid from the fluid inlet to the fluid outlet;
    a processing unit for the electrically operated pump configured to control an operation of the electrically operated pump in response to an electrical energy, the electrical energy having a wave form;
    the processing unit is configured to determine respective selected half cycles in which the electrically operated pump is energized based on:
    a target ratio, wherein the target ratio is a ratio between a target flow rate and a predefined maximum flow rate of the electrically operated pump, and
    calculation of an activation ratio, wherein the activation ratio is a ratio between a number of past half cycles for which the electrically operated pump was energized to a number of overall half cycles during a respective beverage preparation process.

2. The beverage preparation device according to claim 1, wherein the processing unit of the beverage preparation device is configured to constantly compare values of the target ratio and the activation ratio.

3. The beverage preparation device according to claim 1, wherein the processing unit is configured to individually calculate for each of the respective half cycles of the wave form of the electrical energy whether the electrically operated pump is to be energized throughout the respective half cycle or not.

4. The beverage preparation device according to claim 1, wherein the electrically operated pump is configured to be energized by the processing unit for the respective half cycle when the activation ratio is lower than the target ratio.

5. The beverage preparation device according to claim 1, wherein the beverage preparation device is void of a flow meter for detecting an actual flow rate in a fluid circuit of the beverage preparation device.

6. The beverage preparation device according to claim 1, wherein the processing unit of the beverage preparation device is void of a burst fire control or a phase angle control.

7. The beverage preparation device according to claim 1, wherein the wave form of the electrical energy is a sinusoidal alternating current.

8. The beverage preparation device according to claim 1, wherein the beverage preparation device comprises a component configured for identifying the ingredients-containing cartridge inserted in the beverage preparation device and enabling the processing unit to define the target flow rate and/or an amount of the fluid injected into the ingredients-containing cartridge during the beverage preparation process.

9. The beverage preparation device according to claim 1, wherein the electrically operated pump comprises a spring-loaded linear pumping member.

10. The beverage preparation device according to claim 1, wherein the predefined maximum flow rate of the electrically operated pump is obtainable when energizing the electrically operated pump in each of the respective half cycles.

11. A method for controlling an electrically operated pump for pumping a fluid from a fluid inlet to a fluid outlet of a beverage preparation device, the method comprising:
generating a control signal for operating the electrically operated pump from an electrical energy having a wave form;
providing the control signal to energize the electrically operated pump only throughout selected half cycles of the wave form of the electrical energy;
wherein the respective selected half cycles in which the electrically operated pump is energized are determined:
based on a target ratio, wherein the target flow rate is a ratio between a target flow rate and a predefined maximum flow rate of the electrically operated pump, and
based on calculation of an activation ratio, wherein the activation ratio is a ratio between a number of past half cycles for which the electrically operated pump was energized to a number of overall half cycles during a respective beverage preparation process.

12. The method according to claim 11, wherein the method comprises constantly comparing values of the target ratio and the activation ratio and determining whether the electrically operated pump is to be energized throughout the respective half cycle or not.

13. The method according to claim 11, comprising providing the control signal to energize the electrically operated pump throughout the respective half cycle of the wave form of the electrical energy when the activation ratio is lower than the target ratio.

14. The method according to claim 11, comprising:
setting the target ratio for the beverage preparation device based on a ratio of a desired target flow rate and the predefined maximum flow rate of the pump,
setting an initial integer value of counting variables A and B to "1",
comparing for each respective half cycle of the wave form of the electrical energy a ratio of A/B to the target ratio, and:
if the ratio A/B is less than or equal to the target ratio, energizing the electrically operated pump throughout the respective half cycle and increasing the integer value of counting variable A by "+1"; and
if the ratio A/B is greater than the target ratio, not energizing the electrically operated pump throughout the respective half cycle,
increasing the integer value of counting variable B by "+1" after determination of the ratio A/B for each of the respective half cycles.

15. The method according to claim 11, wherein when at one step ($B_{max}$) the beverage preparation device determines that, for the corresponding half cycle (n) of the wave form of the electrical energy, the difference between a ratio of $A/B_{max}$ and the target ratio is less than a predetermined percentage, each of the initial integer values of counting variables A and B are reset to 1.

* * * * *